June 10, 1958     V. E. GLEASMAN     2,838,126
TILTING CAB
Filed April 16, 1956
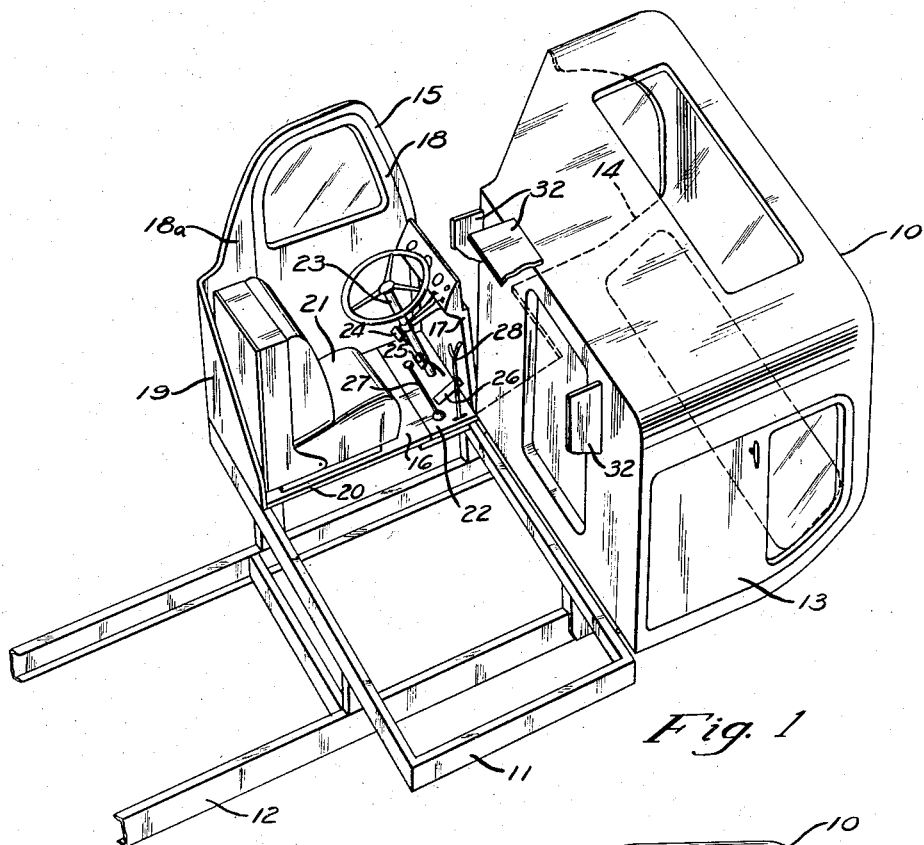
Fig. 1
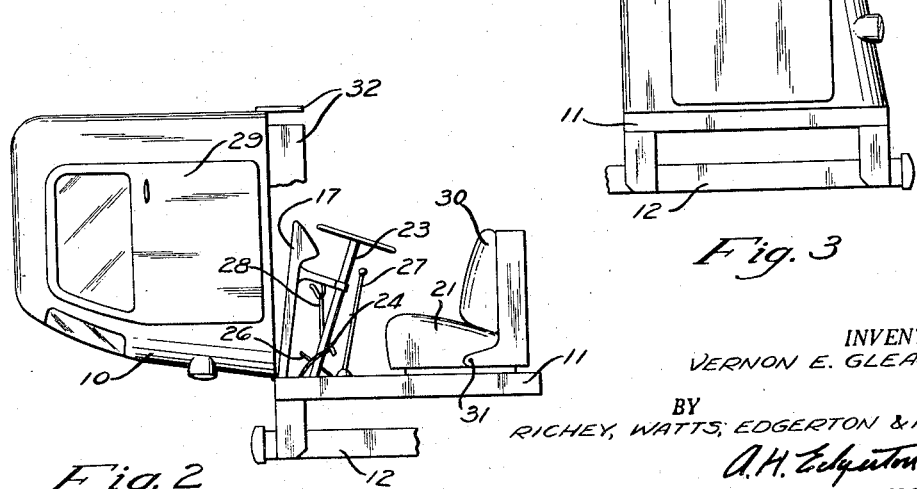
Fig. 2
Fig. 3
INVENTOR.
VERNON E. GLEASMAN
BY
RICHEY, WATTS, EDGERTON & McNENNY
ATTORNEYS

United States Patent Office 2,838,126
Patented June 10, 1958

2,838,126
TILTING CAB

Vernon E. Gleasman, Cleveland Heights, Ohio, assignor to The White Motor Company, Cleveland, Ohio, a corporation of Ohio Application April 16, 1956, Serial No. 578,494

4 Claims. (Cl. 180—89)

This invention relates broadly to tilting cabs for commercial vehicles, and more specifically to an improved cab which is designed for forward tilting movement free and independent of the steering column and other vehicular control units.

The primary object of the invention is to provide a cab which is adapted to enclose the vehicle controls, yet afford ready access to the engine and chassis sub-assemblies when the cab is in its tilted position.

Another object of the invention resides in the provision of a door and frame assembly rigidly mounted on the chassis adjacent the steering column and a tilting cab having an opening therein which is configured for telescopic engagement with the door frame.

A further object of the invention is to provide a valance or shield depending from the sides and rearward lower edge of the cab to overlie and close the opening between the floor of the cab and the frame when the cab is disposed in its operative position.

Another object of the invention is to provide a frame which is affixed to the chassis and provided with a door having a vertically sliding window therein, and to further provide a recess in the body of a tilting cab for the reception of the window when adjusted to its elevated position.

Other objects and advantages more or less ancillary to the foregoing, and the manner in which all the various objects are realized, will appear in the following description, which considered in connection with the accompanying drawings, sets forth the preferred embodiment of the invention.

Referring to the drawings:

Fig. 1 is a view in perspective of a fragmentary portion of the forward end of a truck illustrating the cab in its tilted position, certain parts of the engine and chassis being omitted in the interest of clarity;

Fig. 2 is an elevational view of the left side of a fragmentary portion of a vehicle illustrating a modified form of the improved cab in its lowered position; and Fig. 3 is an elevational view of the right side of the forward end of a truck illustrating the cab shown in its lowered operative position.

Referring first to Fig. 1, the forward lower edge of the cab 10 is pivoted to a rectangular cross frame 11 secured to the lineal side rails 12 of the vehicle chassis. The cab is formed with an entrance door 13 in one side thereof, and an opening 14 in the opposed side configured for abutting engagement with a door frame 15 which is rigidly attached to the cross frame 11, floor boards 16, and instrument panel stanchion. The frame supports the door 18 and includes a side panel 18a and a gusset plate 19 which is disposed in a vertical plane common to the rearward edge of the cross frame 11. The floor boards are relatively narrow and are preferably fixed in place on the frame 11, though the rearward section 20 thereof may, if desired, be mounted to accommodate the ready removal thereof along with the driver's seat 21. The instrument stanchion 17, and the forward floor board 22 are mounted in fixed position on the chassis, and the vehicular control units, including the steering gear assembly 23, the clutch, brake and accelerator pedals 24, 25 and 26, and the gear shift and parking brake levers 27 and 28 are each permanently connected to the chassis and coupled with the linkage therefor to perform their respective operative functions.

In the modified form, illustrated in Fig. 2, both sides of the cab are similar, the door 29 being mounted in the panel adjacent the driver's seat in the manner of the door 13 illustrated in Fig. 1. As will be seen in Figs. 1 and 2, the seat back 30 is fulcrumed on pins 31 to facilitate the forward tilting movement thereof incident the elevation of the rearward end of the cab. The lower side and rear edges of the cab are provided with depending plates or valances 32 to overlie and close the opening between the floor of the cab and the cross frame 11.

From the foregoing it will be seen that the cab may be tilted over the fixed control units to facilitate adjustment and repair of all of the engine parts, save only those below the forward narrow floor board 16; that the fixed door frame provides a rigid stable support for the door and relieves the cab from an appreciable amount of weight; and that the cab of either Fig. 1 or 2 facilitates substantial savings in the manufacture of the cab and control units, and further economies in the hands of the user due to the ease of adjustment of the engine parts and accessories.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A tilting cab for a motor vehicle embodying a body cross frame, control units mounted on said cross frame in fixed operative position, a cab pivoted for forward tilting movement on said cross frame, said cab having an opening in one side thereof, a door in the opposed side of the cab, and a door frame affixed upon said cross frame configured for abutting engagement with the edge of said opening in said cab.

2. A tilting cab for a motor vehicle embodying a body cross frame, control units mounted thereon in fixed operative position, a cab pivoted at its forward lower edge to the forward edge of said cross frame, said cab having an opening in one side thereof, a door mounted in the opposed side of the cab, and a door frame and door affixed to said cross frame configured for abutting registration with the edge of said opening in said cab.

3. A tilting cab for a motor vehicle embodying a body cross frame, control units mounted thereon in fixed operative position, a cab pivoted for forward tilting movement on said cross frame, a door frame affixed to said cross frame adjacent said vehicle control units, a door hinged on said door frame, said cab having an opening in the side thereof adjacent said door frame for abutting engagement therewith.

4. A tilting cab for a motor vehicle embodying a cross frame mounted on the vehicle chassis, control units mounted on said cross frame in fixed operative position, a cab pivoted for forward tilting movement on said cross frame, a door frame affixed to said cross frame adjacent said vehicle control units, floor boards on said cross frame adjacent said control units, a driver's seat on said floor boards, said cab having an opening in the side thereof adjacent said door frame configured for registration with said door frame, said cab having a second opening in the rearward face thereof for passage of the cab over said seat.

References Cited in the file of this patent

UNITED STATES PATENTS

| | | |
|---|---|---|
| 1,838,880 | Thomas | July 5, 1921 |
| 1,812,067 | Toncray | June 30, 1931 |

FOREIGN PATENTS

| | | |
|---|---|---|
| 585,235 | Great Britain | Feb. 3, 1947 |